July 12, 1932. T. FARMER, JR 1,866,700
WINDSHIELD WIPER
Filed Jan. 23, 1931   2 Sheets-Sheet 1
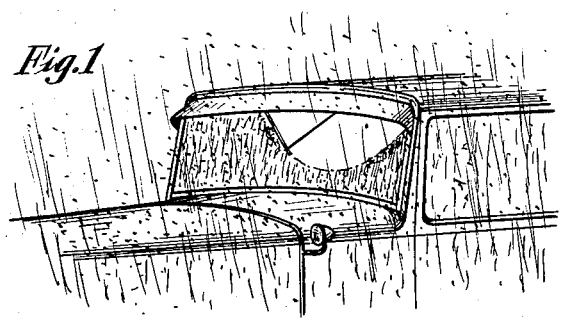
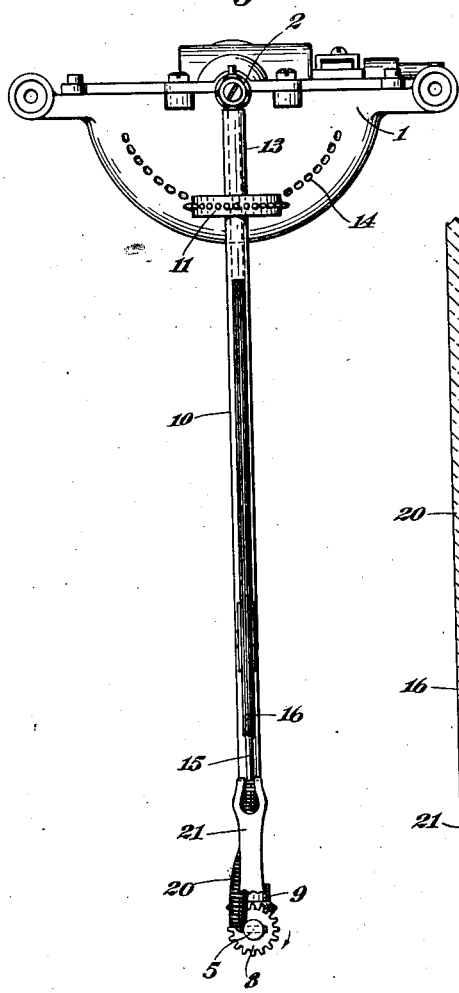
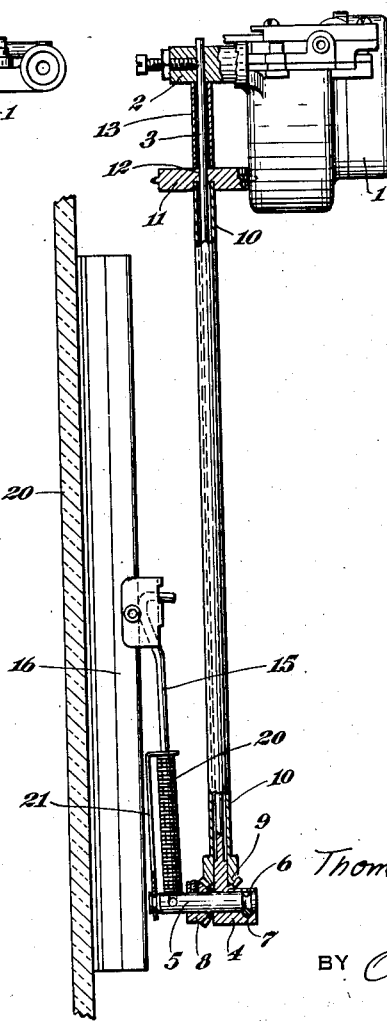
Thomas Farmer, Jr.
INVENTOR
BY O. V. Thiele
ATTORNEY

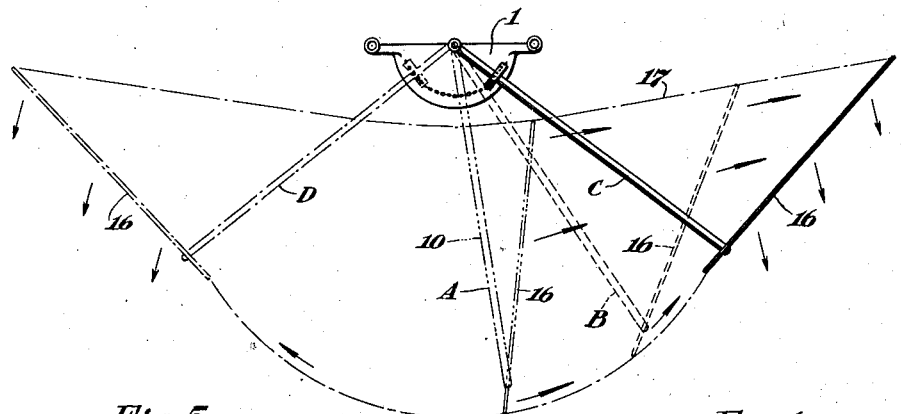
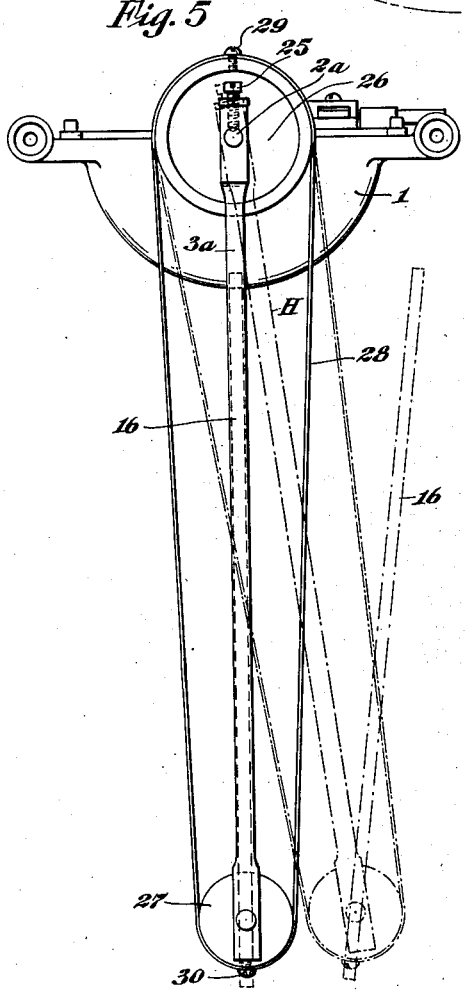
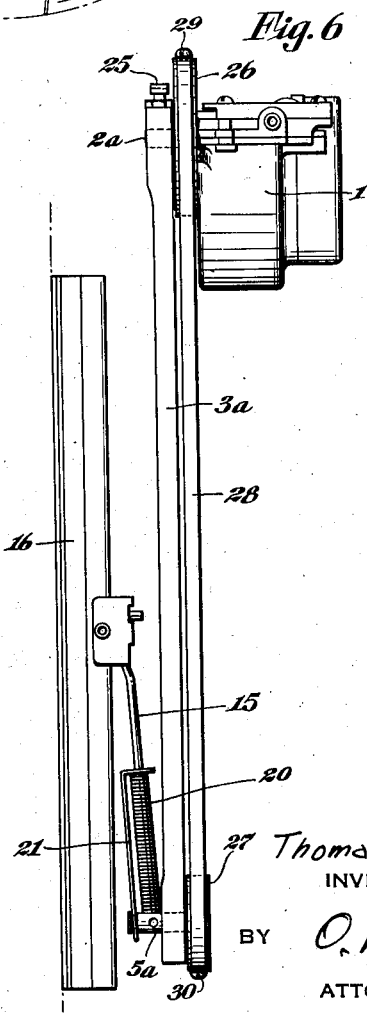

Patented July 12, 1932

1,866,700

UNITED STATES PATENT OFFICE

THOMAS FARMER, JR., OF MAMARONECK, NEW YORK

WINDSHIELD WIPER

Application filed January 23, 1931. Serial No. 510,665.

The present invention relates to so-called windshield wipers for windshields of automobiles and similar purposes. It has for its object the provision of an improved form of such wipers.

The invention will be explained in connection with the accompanying drawings, in which Fig. 1 represents a portion of a car equipped with my windshield wiper; Fig. 2 is a front elevation of my device; Fig. 3 is a side elevation, with portions in section, of the device; Fig. 4 is a view illustrating several positions of the wiper; Figs. 5 and 6 are views, corresponding to Figs. 2 and 3 respectively, of a modification.

In the ordinary type of windshield wiper in which the engine or driving element is mounted at the upper edge of the windshield and the wiping element extends radially from the engine or driving element and oscillates about the engine as center the serious difficulty exists, as is well known to every motorist, that at the return of the wiper the water follows the wiper back into the cleared area. This results from the fact that at this time the wiping side of the wiper is directed upward from the vertical. The water is therefore simply moved upward on the upward stroke of the wiper and on its return follows it back into the cleared area.

In the case of snow the defect of the present wipers is even more pronounced. The snow will be pushed upward at each stroke and will accumulate above the wiper. It will after each stroke slide downward a little to be pushed back up again, the accumulation increasing with each stroke. This continues until the mass of snow above the wiper becomes so great that the wiper can no longer push it out of the way, after which the wiper will slip up on the snow or else will be stalled.

These difficulties are obviated by my invention, as will be clear from the ensuing description.

My invention is applicable to any form of engine that operates an oscillating wiper. I show it in connection with a well-known form of engine or driving element operated from the vacuum tank, but it is to be understood that an electrically driven operated driving element can have my invention applied equally well. In other words, the means by which the wiper is actuated has no bearing on the applicability of my invention. The engine is illustrated at 1, the oscillating shaft of the engine appearing at 2. Secured to this shaft is the radial arm 3. According to arrangements as used hitherto, this arm would carry the wiper. In my arrangement this arm has secured to it at its lower end a bearing block 4, in which a pin 5 is rotatably mounted, the rear end of the pin or short shaft 5 having an annular groove 6 engaging a pin 7 in the bearing 4, to prevent its coming out of the bearing. The pin 5 carries at 8 one of a pair of beveled gears. The other beveled gear is shown at 9 and is mounted on a lower end of a sleeve or hollow shaft 10 encasing the rod 3. The upper end of the sleeve or hollow shaft 10 has secured to it a pin gear 11 which engages the rod 3 rotatably at 12. 13 is a distance piece between the pin 2 and the pin gear 11. The pins of the gear 11 engage the holes 14 which may be formed directly on the housing of the engine 1 or in a separate plate secured to this housing. These openings are arranged along an arc of which the pin 2 is the center.

Near the outer end of pin 5 is mounted the arm 15, carrying the wiping element 16. The wiping element must be held against the windshield 20 with a certain amount of pressure. The manner in which the arm 15 is mounted in pin 5 and the means used to press the wiper proper 16 against the windshield do not form any part of my invention except as they may enter into the combination I claim. For illustrative purposes I have shown well-known elements in this connection. The arm 15 has its lower end bent at right angles and inserted into a hole in pin 5, the main length of the arm 15 being in the same plane with arm 3. The wiper 16 is carried by upper end of arm 15. A spring 20 on arm 15 is compressed against pin 5 by the angled piece 21, one end of which engages the outer end of pin 5, the other end engaging the spring.

As the arm 3 is moved from the position shown in Fig. 2 toward the right or left, the pins of gear 11 engaging the openings 14 will cause the sleeve or hollow shaft 10 to rotate, thereby rotating the gear 9. This in turn will cause the gear 8 to rotate the pin 5 and with it swing the arm 15 and wiper 16 mounted on it. If the arm is swung to the right, as viewed in Fig. 2, the gear 11 will cause the sleeve 10 to rotate in such a direction that gear 9 will make gear 8 turn counter-clockwise with reference to the pin 5. This will cause the wiper 16 to swing to the right of sleeve 10. Evidently by choosing suitable gear ratios, the rate at which the arm 15 and wiper 16 separate angularly from the arm 3 or sleeve 10 as the arm 3 oscillates about the pin 2 can be made anything desired. My invention contemplates preferably to have this rate such that the arm 15 and wiper 16 will, as arm 3 swings to the right from the vertical position, depart toward the right from the vertical and continue doing this while the motion of arm 3 in this direction continues. This is illustrated in Fig. 4. At A in this figure the arm has swung slightly to the right and the wiper 16 has become inclined toward the right from the vertical. As the sleeve 10 swings over farther to the right to the position B, the wiper 16 continues its departure from the vertical. At C is shown the extreme position which the sleeve 10 is made to assume, which is preferably about 45° from the vertical, and the wiper 16 is here approximately at right angles to the sleeve C. During this motion the uppermost point of the wiper describes, as will be noted from the figure, substantially a straight line 17.

It will be noted that the movement of the wiper is such that at no time is the water or snow which is wiped off by the wiper on the upper side thereof, but is, on the contrary, at all times on the lower side.

One of the essential features of the invention may, therefore, be said to be that the wiper is always in either a vertical position or inclined to the vertical with the side of the wiper toward which the wiper is moving inclined downward away from the vertical. This results in the important advantage referred to above that the water will not follow the wiper into the cleared area when the wiper reverses, and that snow is not piled up above the wiper to slip down back into the cleared space so that it has to be lifted again until it ultimately blocks the wiper, but is on the contrary, on the lower side so it continues to slip downward away from the cleared area.

The wiper has the further great advantage that it moves not squarely against the rain and snow on the shield but that it has a wiping or sliding razor action. In other words, it has simultaneous motions of translation and rotation. At the same time so far from decreasing the area over which the wiper acts, I actually increase it, adding a considerable area at the upper outer portions where it is of greatest value. This will be clear from an inspection of Fig. 4, where the upper end of wiping element 16 is an appreciable distance beyond the farthest point to the right which the old form of wiper covers.

It will be understood, of course, that the wiper in moving toward the left, as viewed in Figs. 2 and 4, assumes corresponding positions, with the wiping element tilted toward the left from the vertical, the extreme left position being shown at D with the wiper 16 substantially at right angles to the sleeve 10.

The angle between the extreme positions C and D can, as already mentioned, be made anything desired within limits, although anything beyond the positions indicated does not result in any particular value. I prefer, although I do not wish to bind myself to this, to use a motion substantially 45° from the vertical in each direction, the angle between positions C and D therefore being approximately 90°. It will be clear that with the arm 3 swinging only through an angle of 90° instead of through a much larger angle as with the ordinary form of apparatus, the number of strokes made by my wiper during a given time will be correspondingly greater than with the old forms. The result is that the wiper, covering as it does a somewhat larger area in approximately half the time as older forms of wipers, travels about twice as fast, and this has the effect of forcibly throwing off from the wiper and even entirely of the windshield water or snow at the end of each stroke.

It will be obvious from what has been said that some other form of mechanism might be used to produce the peculiar movement which I wish to give to the wiping element 16. A second mechanism for this purpose is illustrated in Figs. 5 and 6. The arm 3a is here mounted on pin or shaft 2a, being held against rotation by a set screw 25. The shaft 2a has rotatably mounted on it the wheel 26 which is held rigidly relative to the engine 1. The lower end of arm 3a carries the pin 5a which is free to rotate in a bearing in the arm, and carries on one end the rotatably mounted wheel 27. A thin steel band 28 or the equivalent passes around the two wheels 26 and 27 and is secured to them on their outer sides by screws 29 and 30.

The opposite end of the pin 5a carries the arm 15 and wiper 16 as in the form previously described.

In the vertical position of the arm 3a, the wiper 16 is alined with it. As the arm 3a swings toward the right, as viewed in Fig. 5, into the position H, the wiper 16 swings to the right of the vertical, just as in the form first described.

Still other mechanical movements could be utilized to produce the desired motion of the wiper 16.

In both of the forms used to illustrate my inventive idea, the engine is mounted on the outside of the windshield. This is in accordance with the prevalent practice, but my invention can obviously be equally readily applied in case the engine is mounted on the inside of the windshield. Only such slight changes would be required as are well within the capacity of a skilled mechanic.

I claim:

1. Windshield wiping mechanism comprising a driving engine mounted at the upper edge of the windshield, a radial arm driven by said engine and oscillable thereby, a wiping element pivotally mounted on said arm at a point near the lower end of the arm and a gear rigidly connected to and oscillating with the wiping element, a second gear engaging it and mounted to rotate on the arm, and a third gear mounted on the arm at its upper end and engaging a stationary rack, the second and third gears being rigidly connected.

2. Windshield wiping mechanism comprising a driving engine mounted at the upper edge of the windshield, a radial arm driven by said engine and oscillable thereby, a wiping element pivotally mounted on said arm at a point adjacent to the lower end of the arm, a gear rigidly secured to and oscillating with the wiping element, a sleeve mounted to rotate on the arm and bearing a gear on each end, the lower gear engaging the gear secured to the wiping element, and a stationary rack engaging the upper gear on the sleeve, the ratio of the gears being such that the gear secured to the wiper element rotates faster about its pivot than the arm rotates about its pivot.

3. Windshield wiping mechanism comprising a driving engine mounted at the upper edge of the windshield, a radial arm driven by said engine and oscillable thereby, a wiping element pivotally mounted on said arm at a point adjacent to the lower end of the arm, an element mounted on the same pivot with and fixed relative to the wiping element, an element mounted coaxially with the radial arm and fixed relative to the windshield, and power transmission means engaging said two elements to oscillate the wiping element about its pivot as the radial arm is caused to oscillate about its pivot, the ratio of power transmission being such that the wiping element oscillates faster about its pivot than the radial arm does about its pivot.

4. Windshield wiping mechanism comprising a driving engine mounted at the upper edge of the windshield, a radial arm driven by said engine and oscillable thereby, a wiping element pivotally mounted on said arm at a point adjacent to its lower end and extending generally from said lower end, and mechanism, as the radial arm is oscillated alternately to one side and the other from the vertical, to cause the wiping element alternately to incline away from the vertical on opposite sides from its central position, said mechanism including an element fixed to the wiping element, an element fixed relatively to the windshield, and a power transmitting element engaging the two, the arrangement and relative dimensions of the three elements being such as to result in said motion of the wiping element.

THOMAS FARMER, Jr.